United States Patent
Newell

[11] Patent Number: 6,138,544
[45] Date of Patent: Oct. 31, 2000

[54] DIE-CUTTER WITH PLANETARY CONFIGURATION

[76] Inventor: Gregory J. Newell, 1205-D S. Catalina Ave., Redondo Beach, Calif. 90277

[21] Appl. No.: 09/067,066

[22] Filed: Apr. 27, 1998

[51] Int. Cl.$^7$ ....................................................... B26D 5/08
[52] U.S. Cl. .................................. 83/552; 83/479; 83/563
[58] Field of Search ............................. 83/552, 346, 347, 83/563, 698.61, 479; 483/28, 355; 72/232, 233

[56] References Cited

U.S. PATENT DOCUMENTS

| | | | |
|---|---|---|---|
| 3,257,882 | 6/1966 | Lulie et al. | 83/479 X |
| 3,489,043 | 1/1970 | Dent | 83/864 |
| 3,587,374 | 6/1971 | Stewart | 83/479 |
| 3,599,518 | 8/1971 | Goettsch | 83/13 |
| 3,621,527 | 11/1971 | Michalak | 83/479 X |
| 4,142,455 | 3/1979 | Coburn | 83/479 X |
| 4,976,676 | 12/1990 | Mensing et al. | 83/479 X |
| 5,107,695 | 4/1992 | Vandenbroucke | 83/479 |
| 5,120,297 | 6/1992 | Adami | 83/479 X |
| 5,131,900 | 7/1992 | Schroeder | 83/479 X |

FOREIGN PATENT DOCUMENTS

| | | |
|---|---|---|
| 0 407 354 A2 | 9/1991 | European Pat. Off. . |
| 0 407 354 A3 | 9/1991 | European Pat. Off. . |
| 0 776 741 A1 | 4/1997 | European Pat. Off. . |

OTHER PUBLICATIONS

Brochure, NEXT Corrugated Machinery, Inc., Rotary Die Cutter, undated.

*Primary Examiner*—Rinaldi I. Rada
*Assistant Examiner*—T. Anthony Vaughn
*Attorney, Agent, or Firm*—Lyon & Lyon LLP

[57] ABSTRACT

A rotary die-cutter having a planetary configuration for die-cutting paper products such as corrugated and solid-fiber paper board includes a frame in which is mounted a rotatable turret assembly. Rotatably attached to the turret assembly is a first die-cutting cylinder, a second die-cutting cylinder, and an anvil. Various tools or forms are detachably mounted to the exterior of the first and second die-cutting cylinders to cut, score, or crease paper box packaging materials. Each die-cutting cylinder is either in an operational position or a set-up position depending on the orientation of the turret assembly. In order to change the tools or forms of a die-cutting cylinder, the turret assembly is rotated such that the operational die-cutting cylinder moves to the set-up position, while the die-cutting cylinder in the set-up position simultaneously moves to the operational position. The die-cutter permits an operator to remove the die from the previous order and mount the die for the next order on the die-cutting cylinder that is in the set-up position, while the operational die-cutting cylinder is in the process of die-cutting. As a result, order changes on the die-cutter can be achieved with very little downtime as the turret assembly pivotally rotates the die-cutting cylinders into position.

15 Claims, 4 Drawing Sheets

DIE-CUTTER WITH PLANETARY CONFIGURATION

BACKGROUND OF THE INVENTION

The field of the invention is rotary die-cutting for use in the converting of corrugated and solid-fiber paper board or other like materials.

Rotary die-cutters are used to process a variety of paper products, and are particularly used to cut, score, and crease paper box packaging materials including corrugated cardboard. The die-cutters operate by the interaction of a die-cutting tool, which is affixed onto a die-cutting cylinder, and an anvil. Typically, the die-cutter is used in a process where corrugated paper board passes through a nip formed between a rotating die-cutting cylinder affixed with a cutting tool and an opposing anvil.

Tools or forms are generally fitted to the exterior of the die-cutting cylinder to create a creasing profile or cut into the board. The cuts and creases are formed when the face of the tool is forced through or against the board as it passes through the nip between the anvil and the die-cutting cylinder. The resulting board contains the appropriate creases and cuts. The creased and cut board advances out of the die-cutter through the use of collars, rollers, belts, vacuum belts, or other equivalent means.

As is typical in the industry, the die-cutters are operated on a batch, or order system, wherein numerous orders are run throughout the day. During operation of the die-cutter, it is generally necessary to change the tool located on the exterior of the die-cutting cylinder for each order. Since the tools are generally fastened to the die-cutting cylinder by multiple bolts, the removal and securing of the cutting tools on the die-cutting cylinder can be a time-consuming process. Even when more sophisticated mounting systems or apparatus are used to fasten tools to the die-cutting cylinder, the replacement of the tool on the die-cutting cylinder still requires time, during which the die-cutter cannot be operated. Typically, this process takes from ten to twenty-five minutes in current die-cutter machines. Given that ten or more orders per day are commonly run within the industry, such downtime can reach in excess of four hours per day, or approximately half of the day's production time.

It is generally preferable to have the die-cutting cylinder located above the anvil cylinder so that die-cut scrap that is produced is ejected downwards towards the floor and away from the product. However, if the die-cut cylinder is located above the anvil, any printing that is done will be performed below the board line, since printing is generally done on the side opposite the scores and creases. This creates a problem, however, in that when the die-cutting cylinder is placed at its ideal height, i.e., waist level, the print cylinder is at an undesirable lower level such as thigh height. This lower position is undesirable as printing plates located on the exterior of the printing cylinders are typically equal to the length of the circumference of the printing cylinder and are mounted on a thin, flexible clear plastic such that they hang down. However, for quality printing, it is essential to keep the printing plate clean and undamaged. Consequently, having a location for the printing cylinder suspended well above the floor level (e.g., shoulder height) permits an operator to walk to the printer and mount the printing plate with ease. While the printing cylinder could be raised to waist height, the die-cutting cylinder would have to move correspondingly higher to a position that is awkward and undesirable from an operational perspective.

Consequently, there is a need to create a die-cutter capable of near-continuous operation that increases the productivity of the equipment and process. That is, a need for a machine that allows the cutting tool to be set-up while the die-cutter is actually in operation, producing product with the major cylinders that require tool mounting (print cylinders and die-cut cylinder) to be at more suitable located heights for the operator.

SUMMARY OF THE INVENTION

The present invention is directed to a die-cutter with a planetary configuration for use with paper products including sheeted corrugated and sheeted solid fiber paper board. The die-cutter includes a planetary turret assembly, consisting of two die-cutting cylinders that preferably rotate about an anvil.

In a first separate aspect of the present invention, the die-cutter includes a frame with a conveying path therethrough. A pivotal turret assembly is mounted to the frame. Two die-cutting cylinders are rotatably mounted to the turret assembly. An anvil is rotatably mounted adjacent the conveying path. This arrangement permits the changing of tools located on the exterior of one of the die-cutting cylinders while die-cutting is simultaneously occurring between the other die-cutting cylinder and the anvil.

In a second separate aspect of the present invention, the rotary die-cutter of the first separate aspect includes drives connectable with the rotationally mounted elements when pivoted into the appropriate positions on the frame.

In a third separate aspect of the invention, the die-cutter of the first separate aspect includes an infeed conveyor pivotally mounted to the frame.

Accordingly, it is an object of the present invention to provide an improved die-cutter with increased overall capacity. Other and further objects and advantages will appear hereafter.

DETAILED DESCRIPTION OF THE PREFERRED EMBODIMENT

Figure 1:
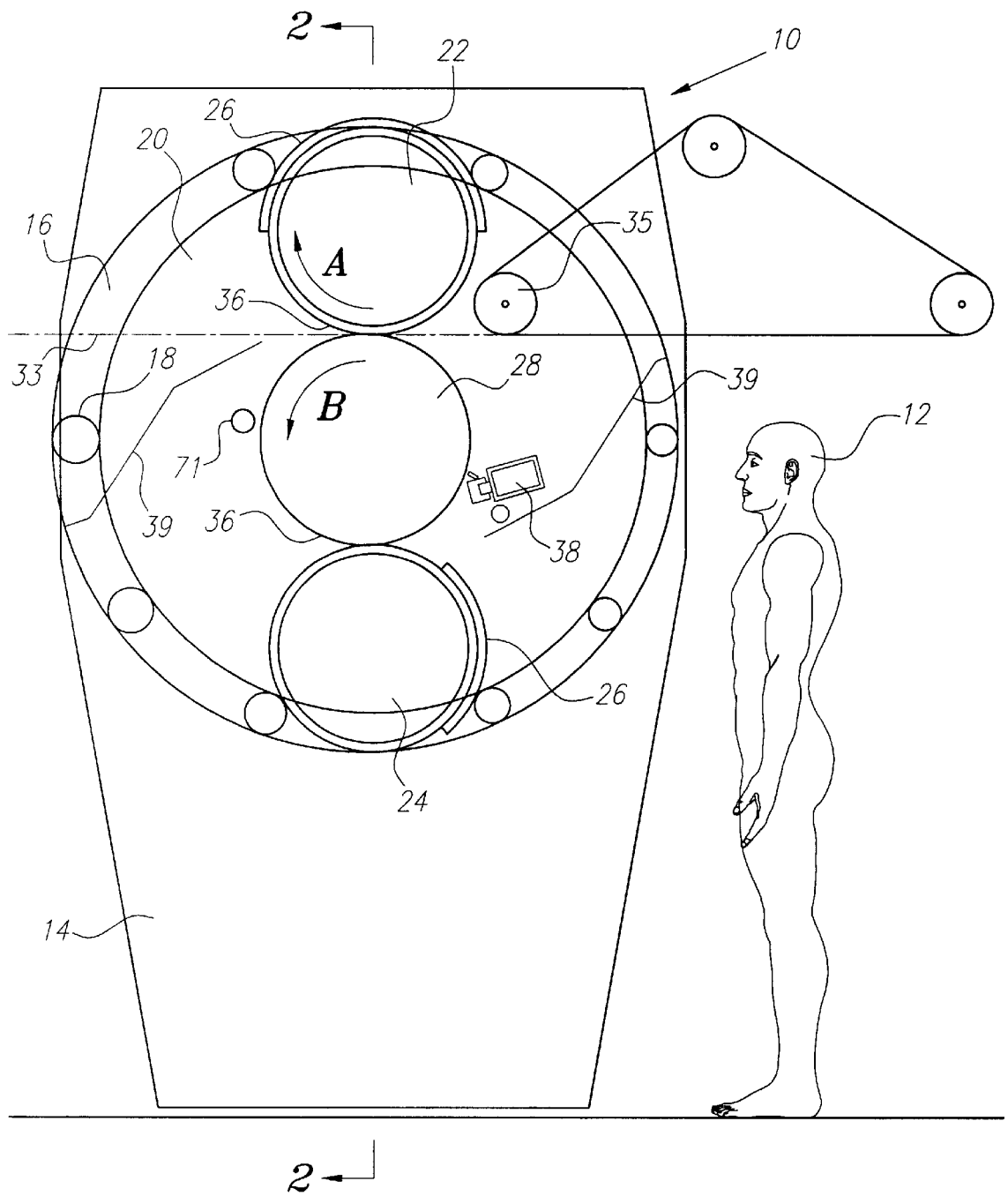
FIG. 1 is a schematic view of a die-cutter in operation.

Turning now in detail to the drawings, FIG. 1 illustrates schematically one preferred embodiment of a die-cutter 10. An operator 12 (approximately 5'11" tall) is shown to give proper perspective to the size of the die-cutter 10. The die-cutter 10 includes a pair of frames 14. A conveying path is defined through the frames 14 by the equipment attached thereto, which can include a vacuum belt transfer, sandwich belt, pull collar, or the like.

Figure 2:
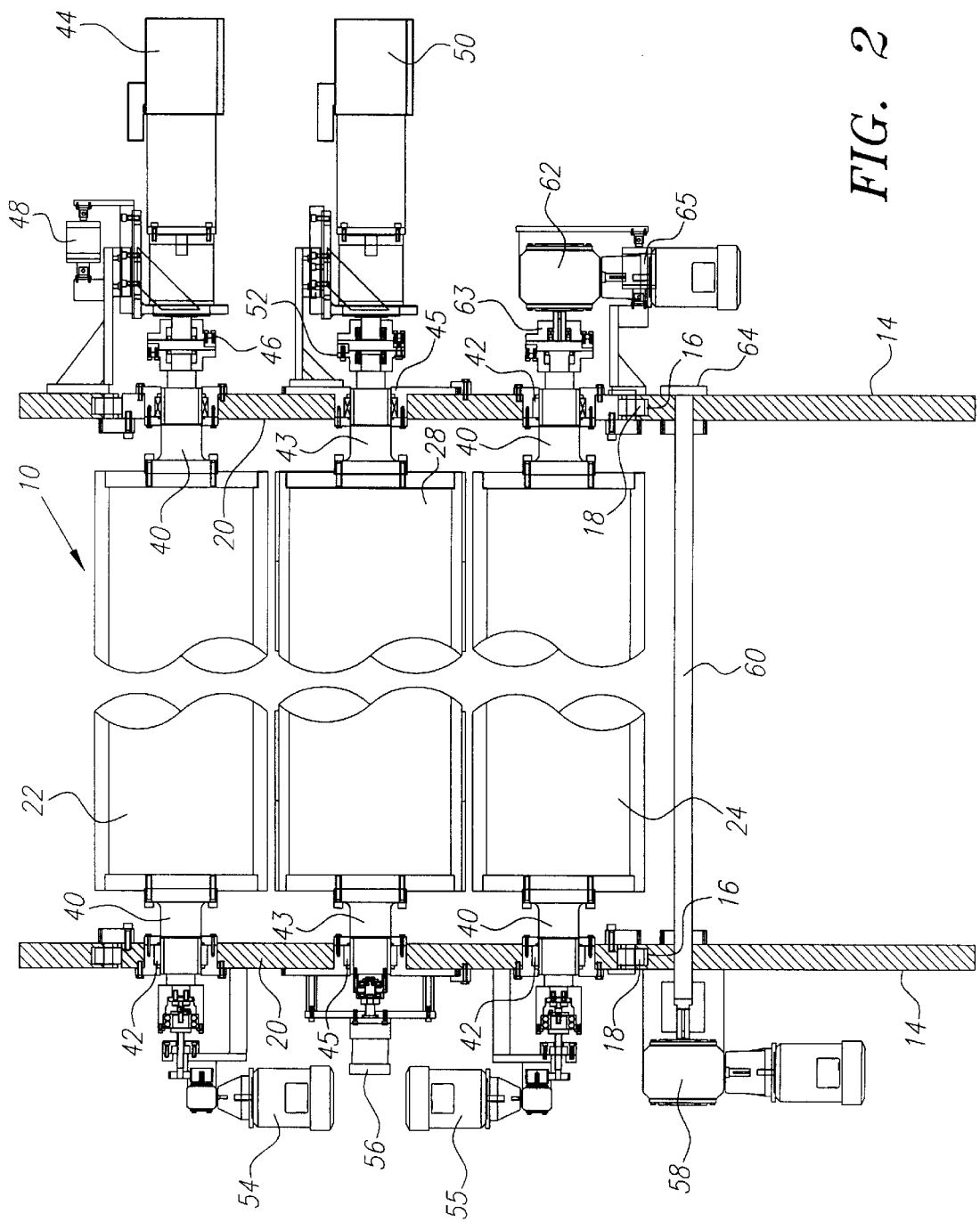
FIG. 2 is a cross-sectional view taken along the line 1—1 of the die-cutter of FIG. 1.
Figure 3:
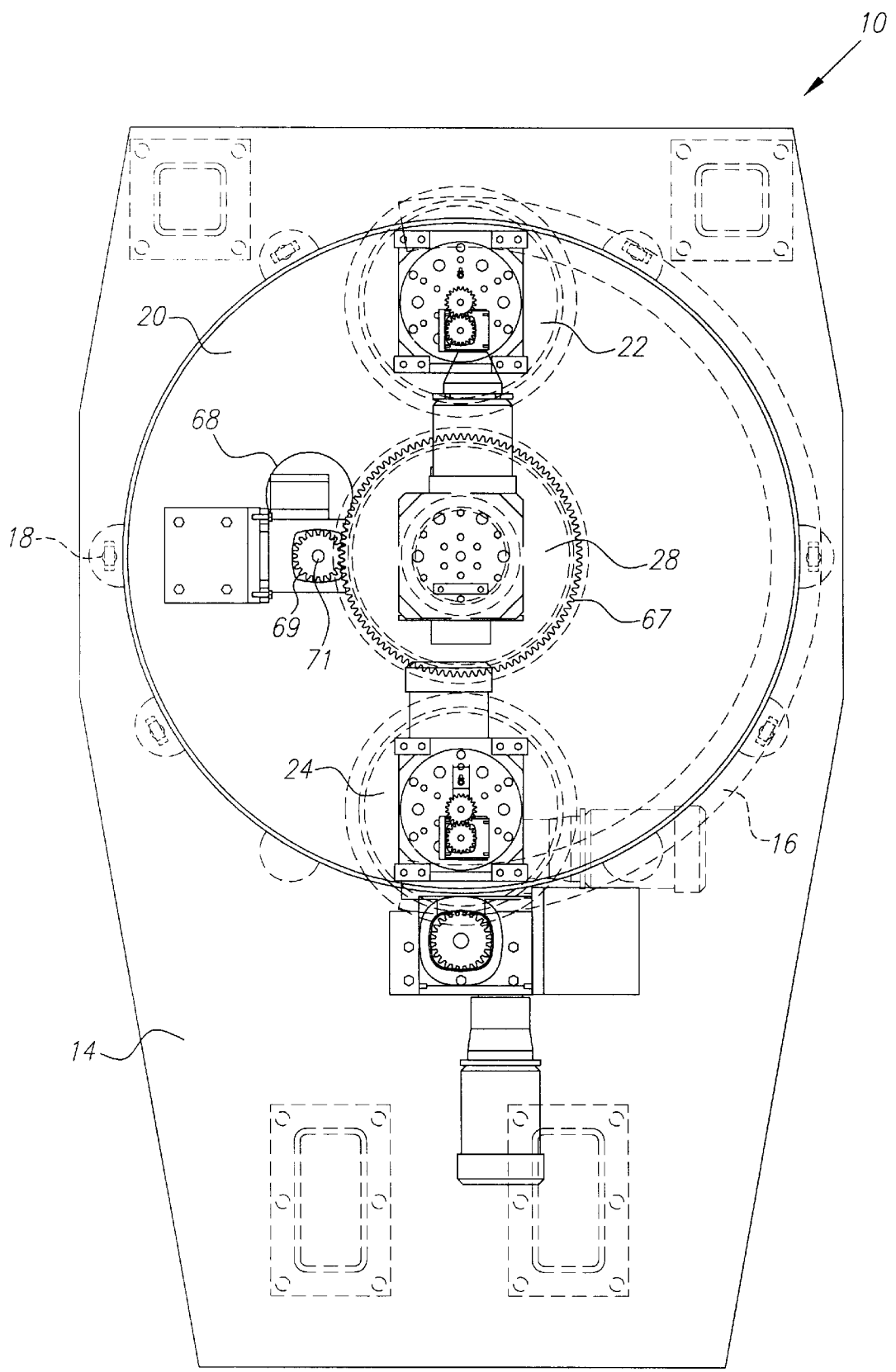
FIG. 3 is a schematic view of a die-cutter showing further detail.
Figure 4:
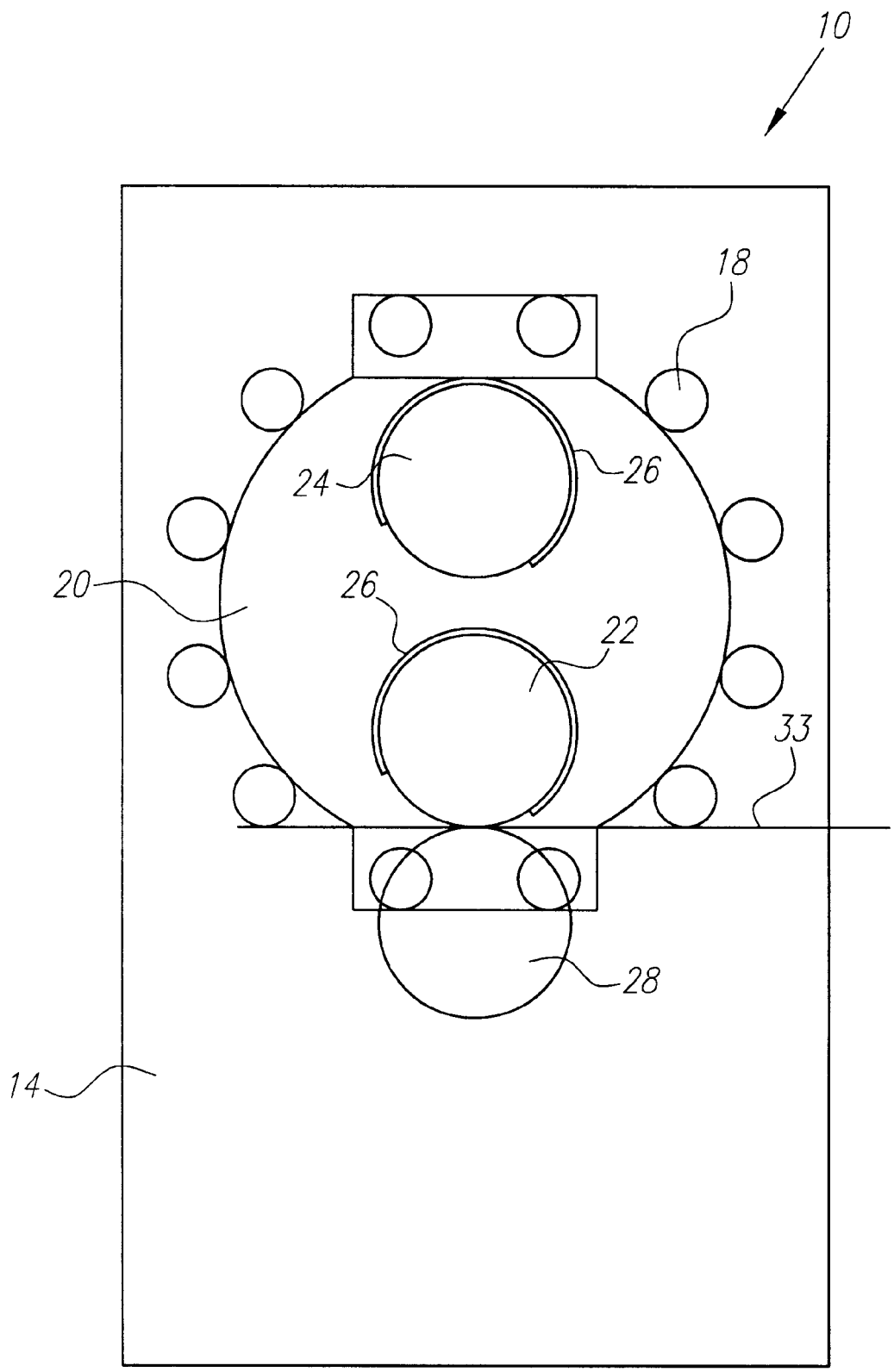
FIG. 4 is another schematic view of a die-cutter.

Referring now to FIGS. 1 and 3, a rack 16 shaped in a circular or semicircular fashion is attached to the inside perimeter of the frames 14. A plurality of heavy-duty turreting roller bearings 18 are located inside an inner ring of each of the frames 14. The roller bearings 18 inside the rack 16 abut a turret assembly 20 to pivotally support the turret assembly 20. While the roller bearings 18 are the preferred method to rotatably support the turret assembly 20, alternatively, other means such as a low friction sliding surface, a screw mechanism, or the like could also be employed to effect the rotation of the turret assembly 20. As can be seen from FIG. 2, there are two turret plates making up the assembly 20 associated with the rack 16 and bearings 18 within the frames 14, respectively. The turret assemblies 20 are thus pivotally mounted within the frames 14 of the die-cutter 10.

Attached to the turret assemblies 20 are first and second die-cutting cylinders 22, and 24. The first and second die-cutting cylinders 22, 24 as shown in FIGS. 1 through 3 are preferably offset from the center of the turret assembly 20. The first and second die-cutting cylinders 22, 24 are rotatably attached to the turret assembly 20.

Preferably, the first and second die-cutting cylinders 22, 24 are made of a high-strength metal such as steel. The die-cutting cylinders 22, 24 preferably have a wall thickness of about 1 inch to about 3 inches. In addition, the wall of the die-cutting cylinders 22, 24 preferably contain a plurality of pre-drilled bolt holes (not shown) such that a tool or form 26 can be bolted thereon. The tool or form 26 is used to provide the desired cut, score, or crease to a board 33 passing through the die-cutter 10. The die-cutting cylinders 22 and 24 and the associated tools or forms 26 are contemplated to be compatible with existing technology.

The tool or form 26 typically consists of a rotary shell, usually made of laminated plywood that is sized to the same internal diameter as the outer diameter of the first and second die-cutting cylinders 22, 24. The tool or form 26 is preferably made in sections of not more than 180°, with lengths varying according to the workability or the particular die requirements. The shell of the tool 26 has a cutting and/or creasing rule (not shown) inserted into the shell according to the required cutting and creasing of the job to be run. In addition, it is typical that a plurality of sponge rubber pieces (not shown) surround the shell of the tool 26 to aid in ejecting the processed boards 33 off the die. The sponge rubber pieces act to eject the waste (scrap) pieces of the board 33 downwards and away from the product such that whatever conveyor means is employed can continue to transport the product on the horizontal plane.

An anvil 28 is located between the first and second die-cutting cylinders 22, 24. The anvil is preferably positioned substantially in alignment with the center axis of the turret assembly 20. The anvil 28 is preferably made of a high-strength metal such as steel and has a wall thickness of about 1 inch to about 3 inches. The anvil 28 preferably has a urethane cover, or the like to permit a cutting tool 26 to pass therethrough during operation.

The vertical alignment of the die-cutting cylinders 22, 24 and the anvil 28 permits the turret assembly 20 to pivot within the side frames 14 such that the first and second die-cutting cylinders 22, and 24 are positionally interchanged. By having the die-cutting cylinders 22, 24 and the anvil 28 supported by the turret assembly 20, all the die-cutting forces are enclosed therein. As can be seen from FIG. 1, the turret assembly 20 pivots across the board line (the plane of board 33 travel) with the die-cutting cylinders 22, and 24 preferably interposed such that the one die-cutting cylinder is above the board line, while the second die-cutting cylinder is below the board line.

In addition, by having the turret assembly 20 pivot about the anvil 28, an operator 12 is given easy access to the die cutting cylinder in the set-up position (second die-cutting cylinder 24 in FIGS. 1 and 3), while the operational die-cutting cylinder (first die-cutting cylinder 22 in FIGS. 1 and 3) is located up above. This arrangement permits a set-up position that is conveniently located around the waist height of an operator 12. This allows a tool 26 to be changed without placing the operator in an awkward position i.e., having to stoop or bending down to change the tool 26. Moreover, when the board line is at approximately 2 meters (6'7"), the turret assembly 20 permits the die-cutting cylinders 22, 24 to be positioned at the desired waist height while any print cylinders can remain at shoulder or head height. This permits an operator 12 to easily and rapidly change any tools 26 and/or printing plates that may be required between orders.

Still referring to FIG. 1, a pivoting vacuum conveyor 35 is located near the first die cutting cylinder 22. The pivoting vacuum conveyer 35 pivots up and out of the path of the first and second die cutting cylinders 22, 24 as the turret assembly 20 rotates.

In the preferred embodiment, a nip 36 is formed between one or the other of the first and second die-cutting cylinders 22, 24 and the anvil 28 depending on the positioning of the turret assembly 20. During operation of the die-cutter 10, the anvil 28 forces the board 33 passing through the nip 36 against the tool 26 and thus provides a surface on which the tool can operate on the board 33.

Still referring to FIG. 1, the die-cutter 10 preferably includes an anvil trimmer 38 that periodically trims the urethane cover that surrounds the anvil 28. In addition, guards 39 are advantageously located near the first and second die-cutting cylinders 22, 24 and the anvil 28 for the safety of the operator 12.

Each of the die-cutting cylinders 22, 24 is supported by the two frame portions 14. As can be seen in FIG. 2, each die-cutting cylinder 22, 24 has a journal end 40 at each end thereof that passes through a bearing 42 located within the turret assembly 20. Each journal end 40 is thus rotatable within the turret assembly 20. The journal ends 40 are securely attached to the die-cutting cylinders 22, 24 respectively thus making the die-cutting cylinders 22, 24 rotatable within the turret assembly 20. In a similar fashion, the anvil 28 is attached to journal ends 43 that pass through bearings 45 within the turret assembly 20. Consequently, all of the die-cutting cylinders 22, 24 and the anvil 28 are rotatable through their own axis relative to the turret assembly 20, which itself is rotatable about its center axis.

Still referring to FIG. 2, a die-cutter drive includes a servo motor 44 mounted to one of the frames 14 and is attached via a separable coupling 46 to the journal end 40 of one or the other of the die-cutting cylinder 22, 24 when positioned above the anvil 28. The servo motor 44 provides the force for rotating the positioned die-cutting cylinder 22, 24 about its axis. The separable coupling 46 permits the servo motor 44 to engage or disengage a die-cutting cylinder (either the first die-cutting cylinder 22 or the second die-cutting cylinder 24) depending on the orientation of the turret assembly 20. The coupling/de-coupling force is provided via an air cylinder 48 which is connected to the frame 14 of the die-cutter 10. The air cylinder 48 extends from a resting state to an extended state to disengage the separable couple 46.

Opposing the servo 44 is a motorized lateral adjustment assembly 54. The lateral adjustment assembly 54 is mounted to the turret assembly 20 and connected to the journal end 40 of the first die-cutter 22. The assembly 54 allows lateral adjustments of the first die-cutting cylinder 22 within the two frames 14 of the die-cutter 10. An additional motorized lateral adjustment assembly 55 is attached to the second die-cutting cylinder 24 via the respective journal end 40. The adjustment assemblies 54 and 55 pivot with the turret assembly 20 rather than being fixed to the frame.

Still referring to FIG. 2, an anvil drive including a servo motor 50 is attached via a coupling 52 to the journal end 43 of the anvil 28. The anvil servo motor 50 provides the power for rotating the anvil 28 about its axis during the operation of the die-cutter 10. The anvil servo motor 50 is mounted in this embodiment to a plate of the turret assembly 20 and pivots with the turret assembly 20 as the cylinders 22 and 24 are positioned.

On the opposing side of the anvil servo motor 50 is an anvil oscillating assembly 56. The oscillating assembly 56 is attached to the journal end 43 of the anvil 28. The anvil oscillating assembly 56 provides a lateral oscillating motion to the anvil 28 such that the urethane layer on the exterior thereof is worn more evenly during operation.

When adjustment of the cutting pressure at the nip 36 is needed, for example when the urethane cover on the anvil 28 wears or needs replacing, it is necessary to adjust the relative gap between operational die-cut cylinder (either the first die-cutting cylinder 22 or the second die-cutting cylinder 24 depending on the orientation of the turret assembly 20) and the anvil 28. An eccentric adjustment on the anvil 28 advantageously allows the anvil 28 to arc up and down relative to the operational die-cutting cylinder. This can be achieved by having the journal end 43 of the anvil 28 fitting off-center into a centrally hubbed large gear 67. A geared motor 68 provides the power to rotate a smaller gear 69, which in turn rotates the large gear 67 housing the journal end 43. As can be seen from FIGS. 1 and 3, a cross shaft 71 connects the smaller gear 69 from one side of the die-cutter 10 to a smaller gear 69 located on the opposing side of the die-cutter 10. The smaller gear 69 simultaneously rotates the centrally hubbed large gear 67 on the opposing side so that both journal ends 43 are moved in the same arc at the same time, keeping the anvil 28 parallel at all times.

The servo motor 50 is supported by a bracket that is attached to the large eccentric gear 67. As the large eccentric gear 67 is rotated to adjust the gap at the nip 36, the servo motor 50 thus rotates as well.

Preferably, the gap between the die-cutting cylinder 22, 24 lies in a position above the anvil 28. The anvil 28 is set according to the thickness of the board 33 being input to the die-cutter 10. Accordingly, the anvil 28 can be adjusted relative to operational die-cutting cylinder (either the first or second die-cutting cylinders 22, 24) depending on the orientation of the turret assembly 10.

The die-cutter 10 further includes a turret assembly drive including a motor 58 that connects to a turret drive shaft 60. Preferably, the turret drive shaft 60 traverses from one side of the frame 14 to the other to index both plates of the turret assembly 20. The motor 58 provides the power for rotating the entire turret assembly 20 for the changing of a form or tool 26. Consequently, when a tool 26 of the operational die-cutter is needed to be changed, the operational cutting cylinder can be rotated into the set-up state while the cutting cylinder in the set-up state is simultaneously moved into an operational position. The rotational motion of the turret drive shaft 60 is advantageously transferred to the turret assembly 20 through a gearing mechanism (not shown).

Further included in the die-cutter 10 is a set-up motor 62. The set-up motor 62 is attached via a separable coupling 63 to the journal end 40 of the second die-cutting cylinder 24. The set-up motor 62 provides the force for rotating the second die-cutting cylinder 24 about its axis in the lower location. In FIG. 2, the set-up motor 62 is connected to the second die-cutting cylinder 24. However, this is merely for illustrative purposes, for the set-up motor 62 can attach via the separable coupling 63 to either the first or second die-cutting cylinder 22, 24. The separable coupling 63 permits the motor 62 to engage or disengage a die-cutting cylinder (either the first die-cutting cylinder 22 or the second die-cutting cylinder 24) depending on the orientation of the turret assembly 20. The coupling/de-coupling force is provided via an air cylinder 65 which is connected to the frame 14 of the die-cutter 10. The air cylinder 65 extends from a resting state to an extended state to disengage the separable couple 63.

In operation, an order or batch of boards 33 is initiated, the servo motor 44 and the anvil servo motor 50 begin to spin the first die-cutting cylinder 22 and the anvil 28, respectively. The first die-cutting cylinder 22 is in the operational state in the position shown, namely, the position that is used to cut, crease or score the input boards 33. As shown in FIG. 1, the first die-cutting cylinder 22 rotates in the clockwise direction as shown by arrow A. Conversely, the anvil 28 rotates in the counter-clockwise direction of the arrow B at substantially the same speed as the first die-cutting cylinder 22.

The incoming board 33 enters the nip 36 formed between the first die-cutting cylinder 22 and the anvil 28. The rotation of the tool 26 on the exterior of the first die-cutting cylinder 22 then impinges on the board 33 to create a crease, score, or cut according to the various rules placed on the outside of the tool 26. The now die-cut board 33 passes out of the die-cutter 10 for additional processing, i.e. stacking, folding, gluing, etc.

During operation, while boards 33 are passing through the first die-cutting cylinder 22 and the anvil 28, the second die-cutting cylinder 24 is in the set-up position. Preferably, this set-up position is lower relative to the operational cylinder. Most preferably, the set-up position is at or around the normal waist-level working height of the operator 12. The second die-cutting cylinder 24 is preferably stationary, or is slowly rotated by the operator 12 via the set-up motor 62. The die-cutting cylinder 24 can be slowly rotated to the desired position by the operator 12 through the use of a push-button, foot pedal, or the like.

Accordingly, the tool 26 located on the exterior of the die-cutting cylinder 24 can be readily removed by the operator 12 and then fit with another tool 26 for the next batch or order. Typically, this requires the operator 12 to first unscrew the existing tool 26 on the exterior of the die-cutting cylinder and bolt the new tool 26 on the exterior thereof.

When the order being run is completed, the turret assembly motor 58 is engaged to rotate the turret assembly 20 such that the die-cutting cylinder 24 is rotated into the operational position at the nip 36. With reference to FIG. 1, the second die-cutting cylinder 24 would rotate from the lower, set-up position to the upper operational position. Conversely, the first die-cutting cylinder 22 would simultaneously move to the lower set-up position. A turret locking device 64 securely locks the turret assembly 20 into place when the desired orientation is reached. The rotation of the turret assembly 20 permits near-continuous operation of the die-cutter 10 in that there is only a negligible amount of downtime between orders.

Preferably, for changing the tool 26 on the exterior of a die-cutter, the turret assembly 20 rotates in a first direction to position one die-cutting cylinder in the operative position and the reverse direction on the next order change. For example, during a first order change, the turret assembly 20 would rotate in the clockwise direction, while the second order change would involve a rotation in the counter-clockwise direction. Nonetheless, the turret assembly 20 may be arranged to rotate in the same direction, i.e., clockwise, clockwise, for each successive order.

Thus, a die-cutter has been disclosed that permits an operator to easily change the tool of a die-cutting cylinder with minimum downtime on die-cutting operations. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A die-cutter comprising a frame including a conveying path therethrough;

a turret assembly pivotally mounted to the frame;

a first die-cutting cylinder rotationally mounted to the turret assembly;

a second die-cutting cylinder rotationally mounted to the turret assembly;

an anvil rotationally mounted relative to the conveying path and including a cylindrical surface, the conveying path being tangential to the cylindrical surface, the turret assembly including a first position with the first die-cutting cylinder forming a nip with the anvil at the conveying path and the second cylinder displaced from the conveying path and a second position with the second die-cutting cylinder forming a nip with the anvil at the conveying path and the first cylinder displaced from the conveying path;

an anvil drive connectable with the anvil;

a die-cutter drive on the frame and connectable with the first cylinder with the turret assembly in the first position and with the second cylinder with the turret assembly in the second position;

a set-up drive on the frame and connectable with the second cylinder with the turret assembly in the first position and with the first cylinder with the turret assembly in the second position;

a turret assembly drive on the frame and coupled with the turret assembly.

2. The die-cutter of claim 1, the anvil being mounted to the turret assembly.

3. The die-cutter of claim 1, the turret assembly including a pivot axis through the rotational axis of the anvil.

4. The die-cutter of claim 1, further including an infeed conveyor pivotally mounted to the frame.

5. The die-cutter of claim 1, the turret assembly including a pivot axis displaced from the rotational axis of the anvil.

6. The die-cutter of claim 1, the die-cutter drive further including a servo motor mounted to the frame and attached via a separable coupling to the first die-cutting cylinder when the turret assembly is in the first position, and wherein the servo motor is attached via the separable coupling to the second die-cutting cylinder when the turret assembly is in the second position.

7. The die-cutter of claim 1, the set-up drive further including a set-up motor attached via a separable coupling to the second die-cutting cylinder when the turret assembly is in the first position, and wherein the set-up motor is attached via the separable coupling to the first die-cutting cylinder when the turret assembly is in the second position.

8. A die-cutter comprising a frame including a conveying path therethrough;

a turret assembly pivotally mounted to the frame and including a first position and a second position;

a first die-cutting cylinder rotationally mounted to the turret assembly;

a second die-cutting cylinder rotationally mounted to the turret assembly;

an anvil rotationally mounted relative to the conveying path and including a cylindrical surface, the conveying path being tangential to the cylindrical surface, the first position of the turret assembly being with the first die-cutting cylinder forming a nip with the anvil at the conveying path and the second die-cutting cylinder displaced from the conveying path and the second position of the turret assembly being with the second die-cutting cylinder forming a nip with the anvil at the conveying path and the first cylinder displaced from the conveying path;

an anvil drive connectable with the anvil;

a die-cutter drive on the frame and connectable with the first cylinder with the turret assembly in the first position and with the second cylinder with the turret assembly in the second position; and a set-up drive on the frame and connectable with the second cylinder with the turret assembly in the first position and with the first cylinder with the turret assembly in the second position.

9. The die-cutter of claim 8 further comprising a turret assembly drive on the frame and coupled with the turret assembly.

10. The die-cutter of claim 8, the anvil being mounted to the turret assembly.

11. The die-cutter of claim 8, the turret assembly including a pivot axis through the rotational axis of the anvil.

12. The die-cutter of claim 8, further including an infeed conveyor pivotally mounted to the frame.

13. The die-cutter of claim 8, the turret assembly including a pivot axis displaced from the rotational axis of the anvil.

14. The die-cutter of claim 8, the die-cutter drive further including a servo motor mounted to the frame and attached via a separable coupling to the first die-cutting cylinder when the turret assembly is in the first position, and wherein the servo motor is attached via the separable coupling to the second die-cutting cylinder when the turret assembly is in the second position.

15. The die-cutter of claim 8, the set-up drive further including a set-up motor attached via a separable coupling to the second die-cutting cylinder when the turret assembly is in the first position, and wherein the set-up motor is attached via the separable coupling to the first die-cutting cylinder when the turret assembly is in the second position.

* * * * *